(12) United States Patent
Migliore et al.

(10) Patent No.: US 8,096,736 B2
(45) Date of Patent: Jan. 17, 2012

(54) MACHINING UNIT, PARTICULARLY FOR MACHINING THE SURFACE OF CYLINDRICAL CAVITIES, HAVING A TOOL HOLDING ASSEMBLY INCLUDING ACTUATING MEANS FOR ADJUSTING THE TOOL POSITION AND A WIRELESS CONTROL SYSTEM FOR THE ACTUATING MEANS

(75) Inventors: Luigi Migliore, Grugliasco (IT); Angelo Fonte, Grugliasco (IT); Marco Zampollo, Grugliasco (IT)

(73) Assignee: Comau S.p.A., Grugliasco (Torino) (IT)

( * ) Notice: Subject to any disclaimer, the term of this patent is extended or adjusted under 35 U.S.C. 154(b) by 266 days.

(21) Appl. No.: 12/369,835

(22) Filed: Feb. 12, 2009

(65) Prior Publication Data
US 2009/0215598 A1  Aug. 27, 2009

(30) Foreign Application Priority Data

Feb. 26, 2008 (EP) .................................... 08425117

(51) Int. Cl.
*B23C 1/027* (2006.01)
*B23B 39/00* (2006.01)
*B23B 47/02* (2006.01)

(52) U.S. Cl. ........ 409/230; 409/194; 409/208; 408/161; 408/168; 408/8

(58) Field of Classification Search ................. 409/230, 409/144, 231, 232, 186–187, 190, 193–194, 409/207–208, 209; 408/158, 161, 168, 156, 408/8, 10–11; 82/1.2, 1.5

See application file for complete search history.

(56) References Cited

U.S. PATENT DOCUMENTS

| | | | |
|---|---|---|---|
| 3,710,699 A | 1/1973 | Mitani | |
| 4,400,118 A * | 8/1983 | Yamakage et al. | 408/3 |
| 4,416,569 A * | 11/1983 | Yamakage et al. | 408/4 |
| 4,676,127 A * | 6/1987 | Watanabe | 82/1.2 |
| 4,716,657 A * | 1/1988 | Collingwood | 33/561 |
| 5,251,511 A | 10/1993 | Muendlein et al. | |
| 5,564,872 A * | 10/1996 | Veil et al. | 409/234 |
| 5,807,037 A | 9/1998 | Schneider et al. | |
| 6,424,821 B1 * | 7/2002 | Komai et al. | 409/186 |
| 2006/0270540 A1 * | 11/2006 | Takayama et al. | 483/41 |

FOREIGN PATENT DOCUMENTS

| | | |
|---|---|---|
| CH | 351015 A | 12/1960 |
| DE | 4431845 A1 | 3/1996 |
| JP | 2006326740 A | 12/2006 |

OTHER PUBLICATIONS

European Search Report dated Jul. 25, 2008 corresponding to Application No. 08425117.2.

* cited by examiner

*Primary Examiner* — Erica E Cadugan
(74) *Attorney, Agent, or Firm* — Young Basile

(57) ABSTRACT

A machining unit, particularly for machining the surface of cylindrical cavities, has a tool-holder assembly, including an electric actuator for adjustment of the radial tool position. The control signals of the actuator are transmitted to said actuator by a stationary electronic control unit via a wireless communication system. Also provided on board the tool-holder assembly is a system for electrical supply of the actuator, constituted, for example, by one or more batteries or else by an electrical-generation microsystem that exploits a portion of the flow of the high-pressure lubricant-coolant that is fed into the machining area.

11 Claims, 8 Drawing Sheets

Embodiment Wherein the Electric Actuator is
Constituted by a Linear Electric Motor that Controls
the Axial Displacement of the Stem for Governing the
Radial Displacement of the Tool

Fig. 6

MACHINING UNIT, PARTICULARLY FOR MACHINING THE SURFACE OF CYLINDRICAL CAVITIES, HAVING A TOOL HOLDING ASSEMBLY INCLUDING ACTUATING MEANS FOR ADJUSTING THE TOOL POSITION AND A WIRELESS CONTROL SYSTEM FOR THE ACTUATING MEANS

FIELD OF THE INVENTION

The invention herein relates to a machining unit, and in particular a machining unit for machining the surface of cylindrical cavities, having a tool holding assembly including actuating means for adjusting the tool position and a wireless control system for the actuating means.

BACKGROUND

For some time now, it has been proposed (see, for example, the document No. U.S. Pat. No. 3,710,659 and CH-A-351 015) to provide, on a rotating tool-holder assembly, an electric actuator, typically an electric motor with corresponding mechanical transmission, for adjusting the radial tool position, for the purpose of compensating for the wear of the tool following upon the machining operations.

The object of the present invention is to provide a machining unit of the type specified above that will present an extremely simple and light structure and at the same time will guarantee a high precision of operation.

BRIEF SUMMARY

Disclosed herein are embodiments of a machining unit particularly for machining the surface of cylindrical cavities. One such embodiment includes a fixed supporting structure, a bench for supporting a workpiece that is to undergo machining, a machining head, mounted and guided in such a way as to be displaceable at least in two directions orthogonal to one another with respect to the fixed supporting structure, a motor-driven spindle, rotatably mounted on the machining head, a tool-holder assembly, connected in a decoupleable way to one end of the motor-driven spindle, at least one tool, carried by the tool-holder assembly in such a way that it is adjustable in a direction substantially radial with respect to the axis of rotation of the spindle, an electrically controlled actuator, mounted on the tool-holder assembly for governing the radial displacement of adjustment of the at least one tool and an electronic control system for governing the electrically controlled actuator for controlling the tool position. The electronic control system comprises an electronic control unit located in a stationary position with respect to the fixed supporting structure of the machining unit, a wireless communication system including one or both of a wireless transmitter and a receiver device, situated in a stationary position with respect to the fixed supporting structure and one or both of a wireless receiver and a transmitter device, mounted on the tool-holder assembly.

BRIEF DESCRIPTION OF THE DRAWINGS

Further characteristics and advantages of the invention will emerge from the ensuing description, with reference to the annexed figures of drawing, which are provided by way of non-limiting example only, wherein:

FIG. 6 is a schematic representation of an embodiment of the invention wherein the electric actuator is constituted by a linear electric motor.

DETAILED DESCRIPTION OF EMBODIMENTS OF THE INVENTION

With a view to achieving the above object, the disclosed herein are embodiments of a machining unit, which presents all the characteristics that have been mentioned above and is moreover characterized in that it includes: an electronic control system for governing the aforesaid actuator, for controlling the tool position, said electronic control system including a control unit located in a stationary position with respect to the supporting structure of the machining unit; a wireless communication system including a transmitter and/or receiver device, situated in a stationary position with respect to the supporting structure of the machine; and a receiver and/or transmitter device, mounted on the aforesaid tool-holder assembly.

Thanks to the characteristic referred to above, the transmission of control signals to the actuator situated on board the tool-holder assembly, which rotates with the spindle of the unit during the machining operations, does not require the provision of wiring and brush connectors for connection between the actuator and the corresponding electronic control unit, with consequent simplification and lightening of the structure.

A further characteristic of the invention lies in the fact that moreover provided are means of electrical supply of the aforesaid actuator situated on board the tool-holder assembly, once again for the purpose of avoiding wiring and brush connectors for connection of the actuator, which rotates with the spindle of the unit, to stationary units.

In a first embodiment, the aforesaid means of electrical supply include one or more electrical batteries, preferably of a rechargeable type, mounted on board the tool-holder assembly.

In a second embodiment, the aforesaid means of electrical supply of the actuator on board the tool-holder assembly include a generator of electrical energy. According to a particularly advantageous arrangement, the generator of electrical energy is a dynamo-electric machine, driven in rotation by a miniturbine that is actuated by a current of pressurized fluid. For this purpose, provided in the tool-holder assembly is a secondary pipe deriving from a main pipe that feeds the usual flow of pressurized lubricant-coolant in the machining area. In this way, a part of said flow, which is provided for lubrication/cooling in the machining area, is used for actuating the turbine that sets the generator in rotation.

Figure 1:
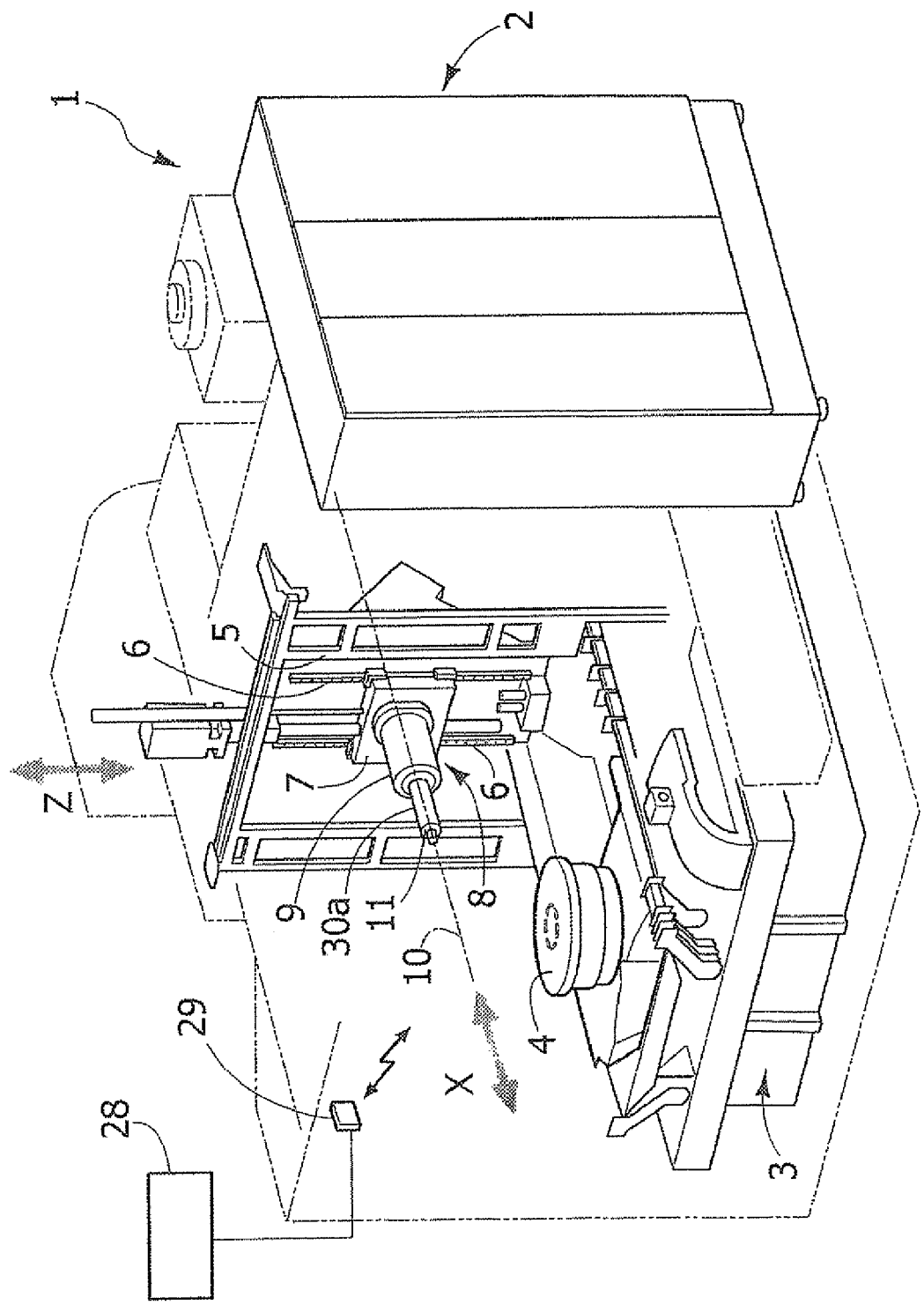
FIG. 1 is a schematic perspective view of an example of embodiment of the machining unit according to the invention.

In FIG. 1, the reference number 1 designates as a whole a machining unit, including a fixed structure 2, including a bed 3, on which a bench 4 is set, designed to support a workpiece that is to undergo a machining operation. The unit illustrated is suited, for example, for being used for the machining of the cylindrical cavities defining the cylinders in the cylinder block of an internal-combustion engine. In the drawings, the means designed to support the workpiece on the bench 4, as well as the means designed to convey the workpiece at input to or at output from the machining unit are not illustrated, since it can be done in any known way and in so far as said conveying means, taken in themselves, do not fall within the scope of the present invention. Also the specific constructional details of the machining unit 1 are not described in what follows, since they can vary widely within the framework of what is known to a person skilled in the branch and, again, they do not fall, taken in themselves, within the scope of the invention. In the case of the example illustrated, slidably mounted on the bed 3 in the direction designated by X is a column structure 5 carrying vertical guides 6, slidably mounted on which in the vertical direction Z is a slide 7 carrying a machining head 8. The head 8 includes a motor-driven spindle 9, which in the example illustrated is mounted so that it can rotate about an axis 10 parallel to the axis X and has one end projecting in cantilever fashion from the slide 7, which is designed to receive in a decoupleable way, according to any known technique, a tool-holder assembly 11. As referred to above, the constructional details of the unit 1 are not illustrated herein. In particular, the motor means designed to control displacement of the structure 5 in the direction X and of the slide 7 in the direction Z are not illustrated; said means may be made and arranged in any known way.

Figure 2:
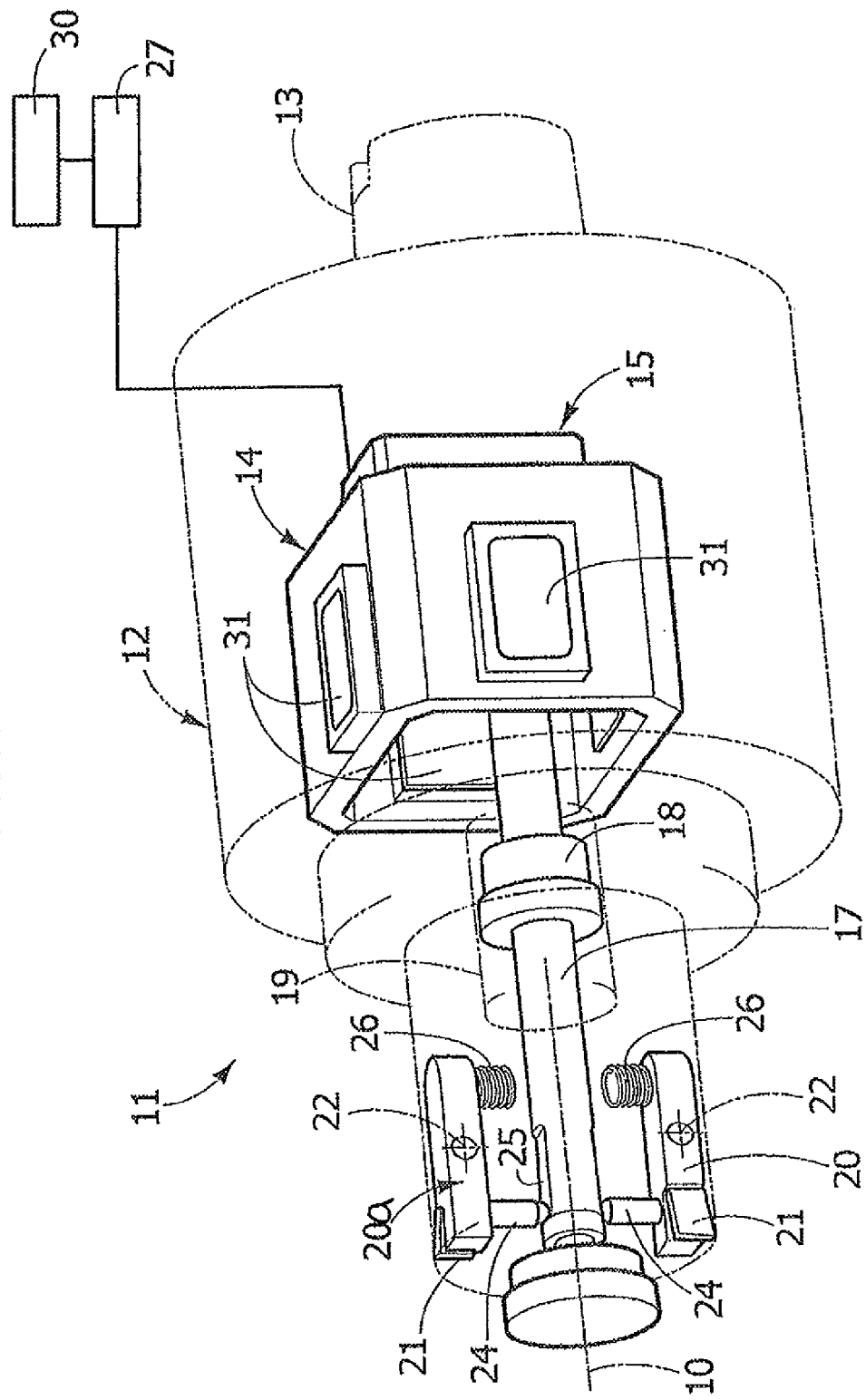
FIG. 2 is a schematic perspective view, at an enlarged scale of the tool-holder assembly forming part of the unit of FIG. 1.
Figure 3:
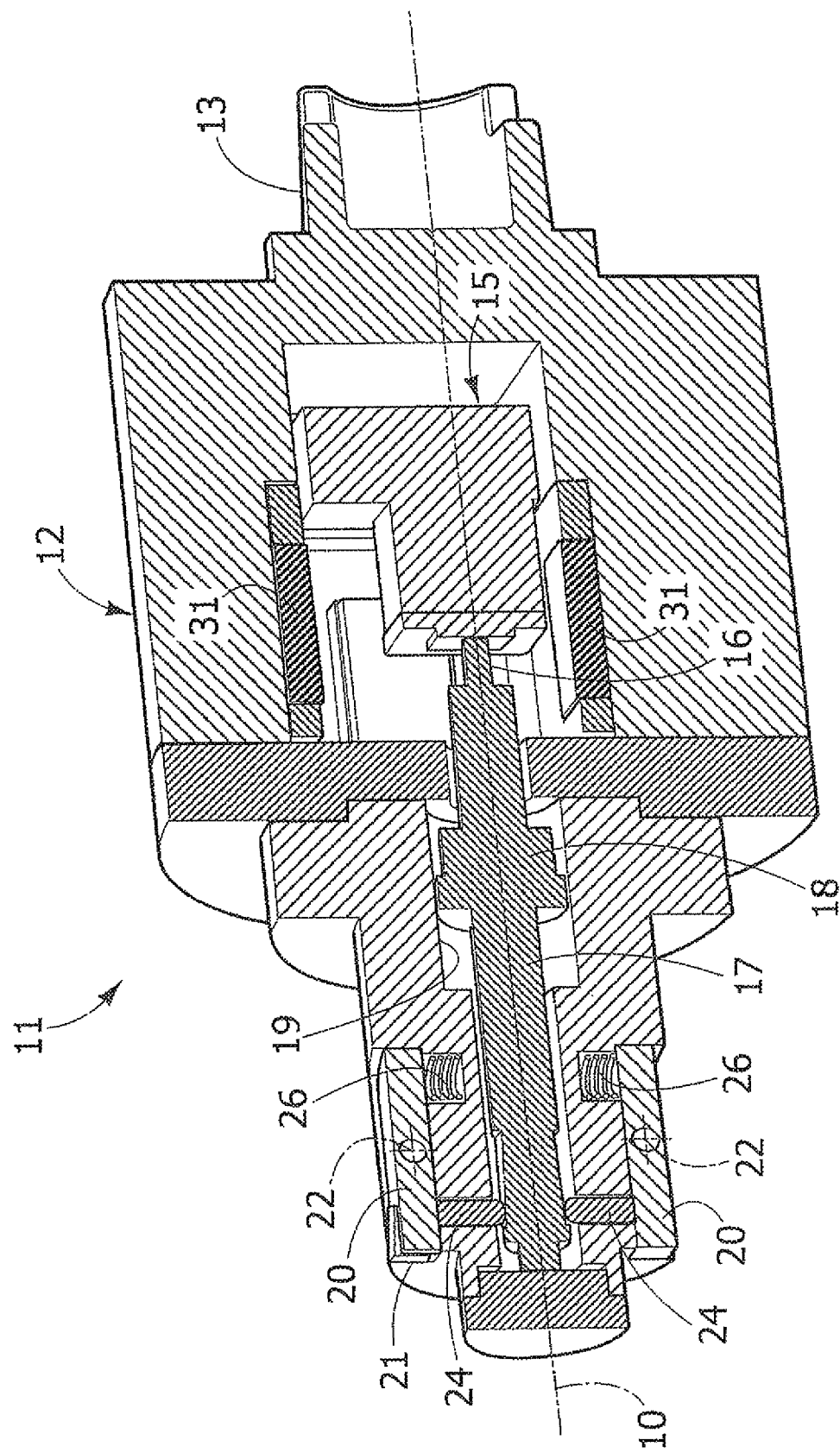
FIG. 3 is a cross-sectional perspective view of the assembly of FIG. 2.

FIGS. 2 and 3 illustrate a first embodiment of the tool-holder assembly forming part of the present invention. The tool-holder assembly 11 includes a cylindrical body 12 having one rear end provided with a shank 13, designed to be received and clamped within a seat (not visible in the drawings) made in the front end of the spindle 9. Also the constructional details corresponding to said coupling and to the clamping means associated thereto are not illustrated, since they may be made in any known way. Set within the body 11 is a module 14 (FIG. 2), which in turn includes inside it an electric servo motor 15. The servo motor 15 sets in rotation an internal screw (not visible in the drawings), screwed into which is the threaded portion of a stem 17 that projects from the module 14 in the direction of the axis 10. Consequently, an activation of the servo motor 15 determines an axial displacement, in the direction of the axis 10, of the stem 17, between two end positions of end-of-travel. The stem 17 has an enlarged cylindrical part 18, which is guided in a slidable way within a cylindrical cavity 19 made in a front portion 20a of the body of the tool-holder assembly 9, said front portion 20a having a diameter smaller than that of the main portion 12 of the body.

The front portion of the tool-holder assembly 11 carries, in diametrally opposite areas, two tools 21, represented by plaques made of hard metal. Each plaque 21 is fixed to the end of a rocker arm 20, which is mounted articulated on the body 12 about an axis 22, set transversely with respect to the axis 10 and at a distance therefrom. One end of each rocker arm 20 is in contact with a radial feeler pin 24, the radially internal end of which co-operates with an inclined cam-shaped surface 25 made laterally on the stem 17. The opposite end of each rocker arm 20 is in contact with a helical spring 26, which is received in a seat made in the body 12 and pushes the respective rocker arm 20 so as to press the respective feeler pin 24 against the respective surface 25 of the arm 17.

As the axial position of the stem 17 varies, this being determined by the servo motor 15, each feeler pin 24 is kept always in contact with the respective surface 25 of the stem so that each rocker arm 22 is forced to oscillate, consequently determining a substantially radial displacement of the respective tool 21. Said displacement is exploited for compensating for the wear of the tool 21 following upon machining operations. When said wear exceeds a pre-set level, such as not to guarantee that the machined pieces are obtained within the pre-set tolerances, each tool 21 is displaced radially outwards so as to compensate for the wear. FIGS. 2 and 3 show the stem 17 in the end position corresponding to the outermost radial positioning of the two tools 21. Of course, the system described above can be used also for displacing each tool between a working position and a retracted inoperative position, in which the tool is set, for example, during the movements of reciprocal displacement between the machining head and the workpiece that is to undergo machining. Furthermore, the aforesaid system applies of course also to arrangements that envisage a different number of tools or also just a single tool.

According to an important characteristic of the invention, the electric servo motor 15 is provided with an electronic-control card 27 (schematically illustrated in FIG. 2, but integrated in practice within the module 14), which is able to exchange control signals by means of a wireless communication system with an electronic control unit 28, which is located in a stationary position with respect to the fixed structure of the machine (see FIG. 1). The wireless communication system includes a wireless transmitter and/or receiver 29, associated to the fixed structure of the machine (see FIG. 1), which communicates with a wireless receiver and/or transmitter 30 (illustrated schematically in FIG. 2), which is incorporated in the tool-holder assembly 11 and has an antenna 30a (visible in FIG. 1).

The wireless communication system can be chosen from among any of the wireless communication systems of a type known in the industrial field. The wireless communication between the device 29 and the device 30 enables exchange of the control signals, as well as the programming, and/or configuration, and/or parameterization of the control card 27 in bi-directional mode (downloading and uploading).

According to the invention, also the means for electrical supply of the servo motor 15 are located on board the tool-holder assembly 11.

In the case of the embodiment illustrated in FIGS. 2 and 3, said means are represented by a plurality of rechargeable batteries 31, for example of the lithium-ion (Li-ion) type.

Figure 4:
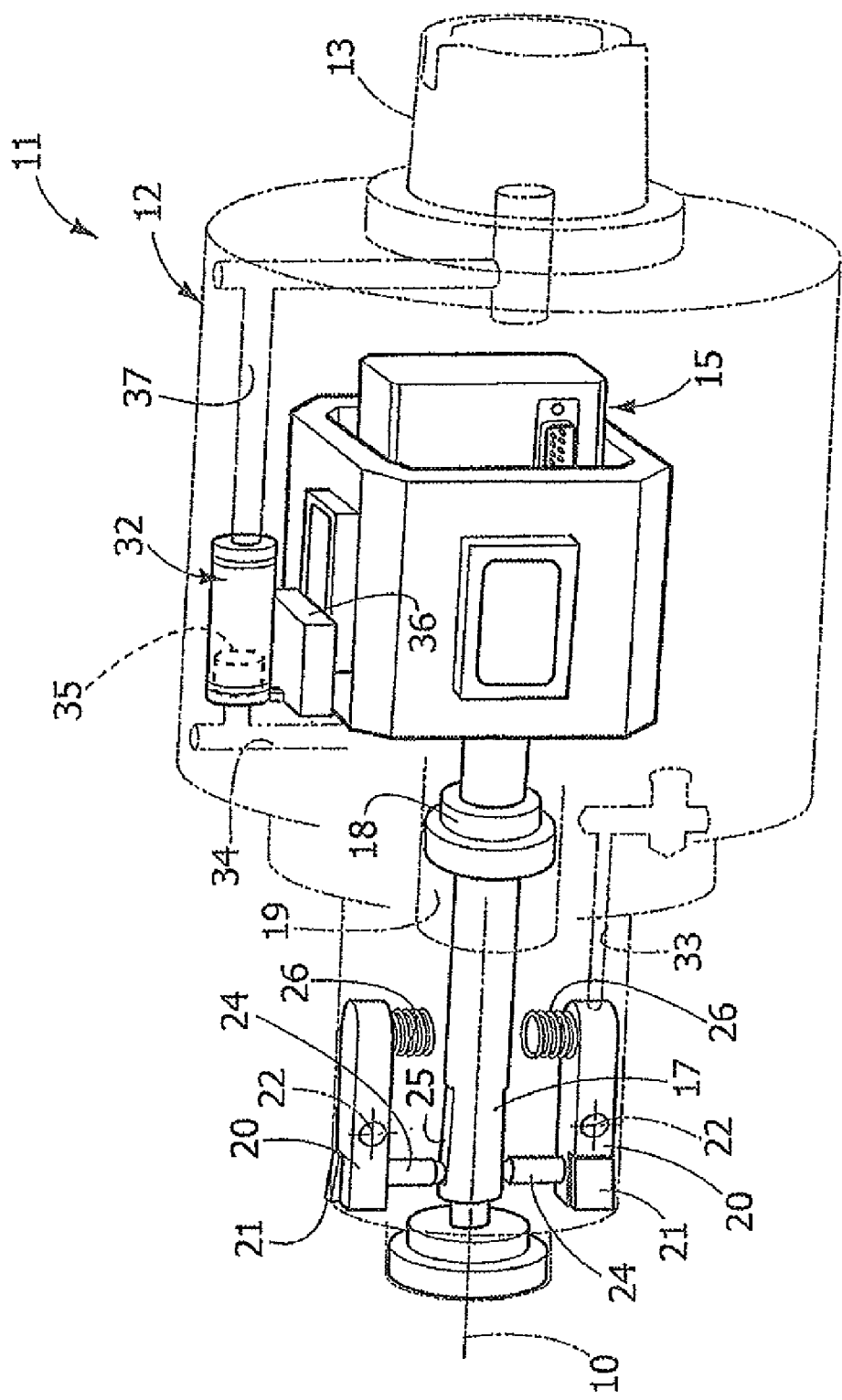
FIG. 4 illustrates a second embodiment of the tool-holder assembly forming part of the unit according to the invention.
Figure 5:
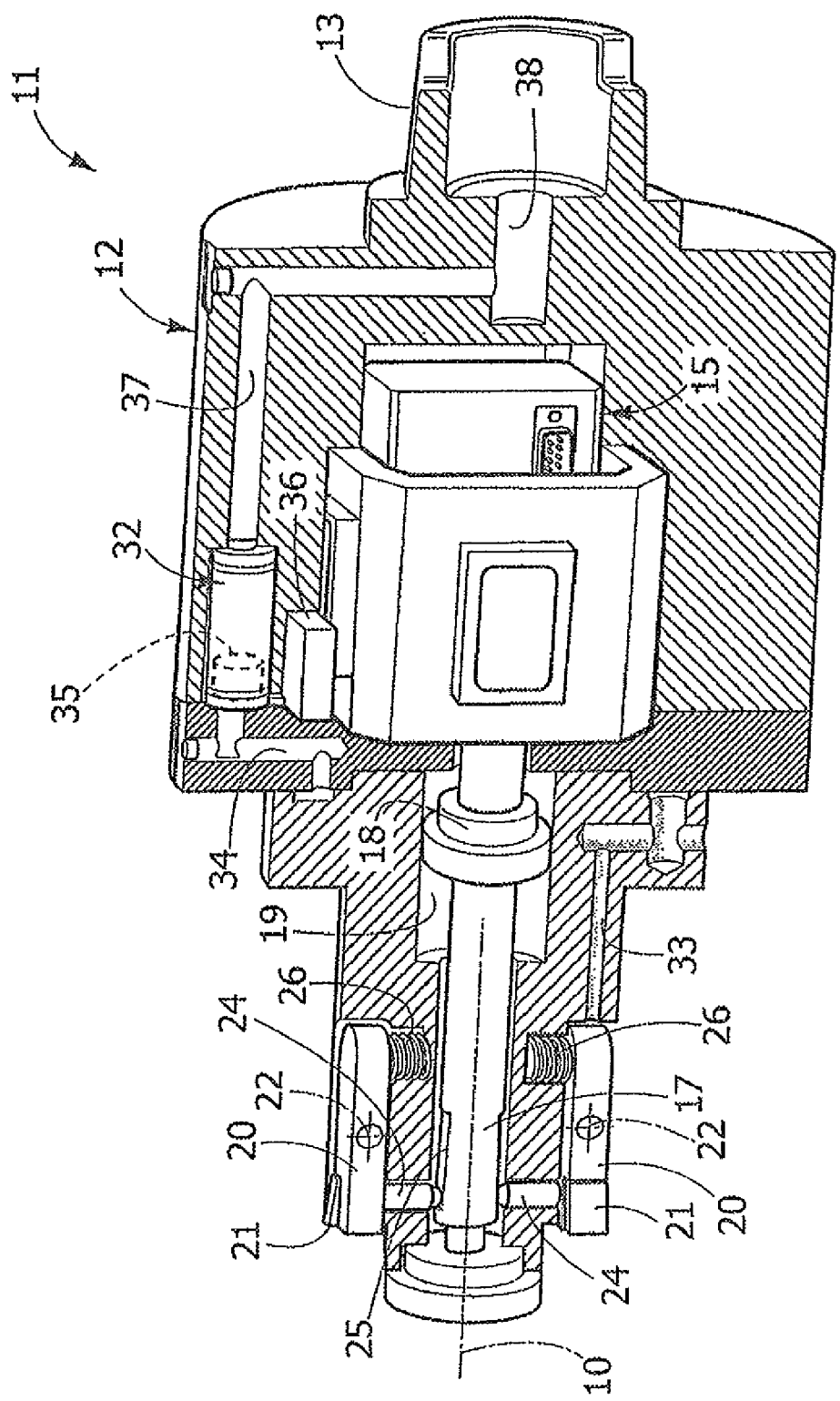
FIG. 5 is a sectioned view of the assembly of FIG. 4.
Figure 8:
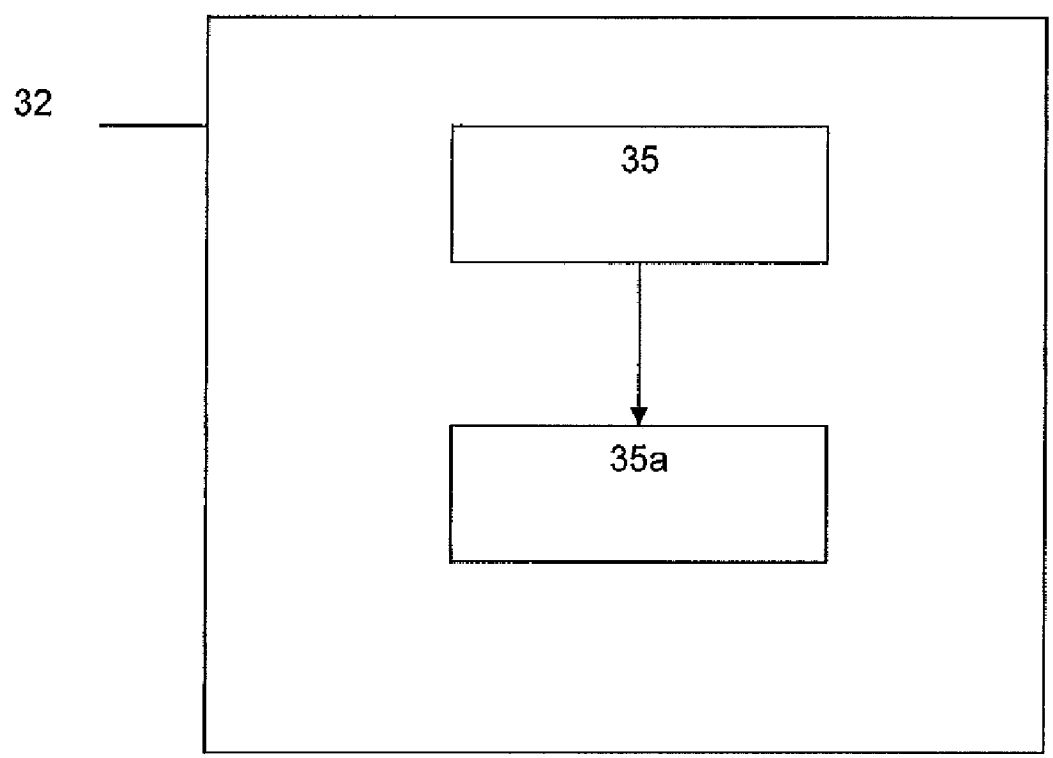
FIG. 8 is a schematic representation of the electrical-generation microsystem 32

The embodiment illustrated in FIGS. 4 and 5 differs from the one described above in that in this case, the means of electrical supply of the servo motor 15 include an electrical-generation microsystem 32, including a microgenerator driven in rotation by a turbine that is actuated with a flow of pressurized fluid. In FIGS. 4 and 5, the parts in common with those of the solution illustrated in FIGS. 2 and 3 are designated by the same reference numbers. In the case of the embodiment of FIGS. 4 and 5, derived from the main pipe 33 for delivery of the high-pressure lubricant-coolant to the machining area, which is normally provided in tool-holder assemblies of this type, is an auxiliary pipe 34, which conveys a part of the aforesaid flow of high-pressure fluid to a turbine 35 (illustrated only schematically in FIG. 5), which drives a microdynamo-electric machine 35a (illustrated only schematically in FIG. 8) in rotation. The output of the electrical generator 32 is connected to the supply of the servo motor 15 via interposition of a charge regulator 36. The fluid at output from the generator is conveyed through a secondary pipe 37 to a discharge outlet 38.

Figure 7:
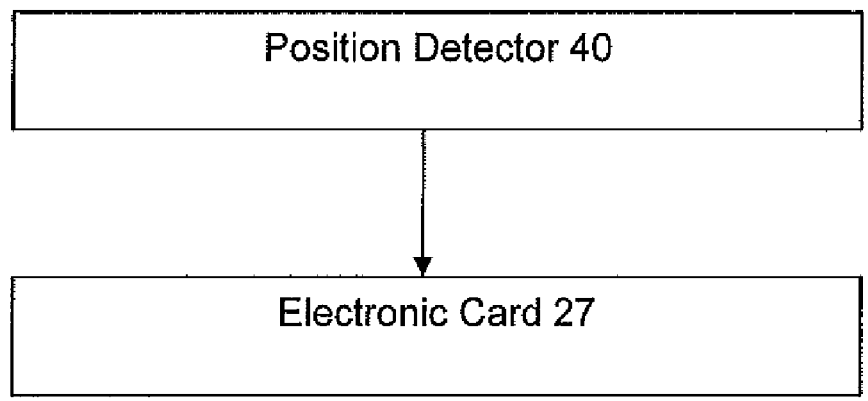
FIG. 7 is a schematic representation of the position detector and electronic card.

During activation of the servo motor 15, the position of the tools 21 and of the stem 17 is controlled with a closed-loop system, by means of a position detector 40 of any known type (shown schematically in FIG. 7), said signal being sent to the electronic card 27 associated to the servo motor 15.

Thanks to the characteristics referred to above, the invention guarantees the possibility of a precise and reliable control of the tool position and of the compensation of the wear with a system having an extremely simple and light structure.

Operation of the unit envisages a control of the machined pieces at output from the unit in order to guarantee timely intervention, when necessary, for compensating for the wear of the tool through activation of the system for adjustment of its radial position. Not ruled out either, in principle, is the possibility of installing a system for control of the machined workpiece directly on the tool-holder assembly.

Of course, without prejudice to the underlying principle of the invention, the details of construction and the embodiments may vary widely with respect to what is described and illustrated herein purely by way of non-limiting example, without thereby departing from the scope of the present invention.

For instance, the electric actuator can be constituted by a linear electric motor that controls the axial displacement of the stem 17, as shown in FIG. 6.

What is claimed is:

1. A machining unit for use in machining the surface of cylindrical cavities, including:
   a fixed supporting structure;
   a bench for supporting a workpiece that is to undergo machining;
   a machining head, mounted and guided in such a way as to be displaceable at least in two directions orthogonal to one another with respect to the fixed supporting structure;
   a motor-driven spindle, rotatably mounted on the machining head;
   a tool-holder assembly, connected in a decoupleable way to one end of the motor-driven spindle;
   at least one tool, carried by the tool-holder assembly in such a way that the at least one tool is adjustable in a direction substantially radial with respect to the axis of rotation of the spindle;
   an electrically controlled actuator, mounted on the tool-holder assembly for governing the radial displacement of adjustment of the at least one tool, the actuator including an electro servo motor for controlling longitudinal axial displacement of a stem for selective radial movement of the at least one tool by means of a screw transmission, the stem having a lateral cam surface cooperative with a feeler pin associated to a rocker arm, which carries the at least one tool so that a longitudinal axial displacement of the stem determines the substantially radial displacement of the at least one tool; and
   an electronic control system for governing the electrically controlled actuator for controlling the radial displacement of the at least one tool, the electronic control system comprising:
   an electronic control unit located in a stationary position with respect to the fixed supporting structure of the machining unit;
   a wireless communication system including a wireless transmitter and a receiver device, one of the respective wireless transmitter and receiver device situated in a stationary position with respect to the fixed supporting structure and the other of the wireless transmitter and receiver device mounted on the tool-holder assembly.

2. The unit according to claim 1, wherein means are provided for electrical supply of the actuator, situated on board the tool-bolder assembly.

3. The unit according to claim 2, wherein the means of electrical supply include one or more electrical batteries of a rechargeable type, mounted within the tool-holder assembly.

4. The unit according to claim 2, wherein the means of electrical supply include a microgenerator, including a dynamo-electric micromachine for supply of the electric actuator, and means for setting in rotation the dynamo-electric micromachine, carried by the tool-holder assembly.

5. The unit according to claim 4, wherein the means for setting in rotation the dynamo-electric micromachine include a microturbine that is actuated by a flow of pressurized fluid.

6. The unit according to claim 5, wherein the tool-holder assembly includes a secondary pipe, which derives from a main pipe that is designed to feed pressurized lubricant-coolant to a machining area, the secondary pipe being provided for feeding a part of the flow of the pressurized lubricant-coolant to the microturbine.

7. The unit according to claim 1, wherein the electric actuator is constituted by a linear electric motor that controls the axial displacement of a stem for governing the radial displacement of the tool.

8. The unit according to claim 1, wherein associated to the electric actuator is an electronic-control card, designed to receive a signal output from a position sensor.

9. A machining unit for use in machining the surface of cylindrical cavities, including:
   a fixed supporting structure;
   a bench adapted to support a workpiece that is to undergo machining;
   a machining head mounted and guided in such a way as to be displaceable at least in two directions orthogonal to one another with respect to the fixed supporting structure;
   a motor-driven spindle rotatably mounted on the machining head;
   a tool-holder assembly connected in a decoupleable way to one end of the motor-driven spindle;
   at least one tool carried by the tool-holder assembly in such a way that the at least one tool is adjustable in a direction substantially radial with respect to the axis of rotation of the spindle;
   an electrically controlled actuator mounted on the tool-holder assembly for governing the radial displacement of adjustment of the at least one tool, the actuator including an electric servo motor adapted to control a longitudinal axial displacement of a stem for governing the radial movement of the at least one tool by a screw transmission, the stem having a lateral cam surface adapted to cooperate with a feeler pin associated to a rocker arm which carries the at least one tool so that the longitudinal axial displacement of the stem determines the substantially radial displacement of the at least one tool,
   a microgenerator having a dynamo-electric micromachine adapted to supply electrical power to the electric actuator carried by the tool-holder assembly, the microgenerator further having a microturbine adapted to be actuated by a flow of pressurized fluid for setting in rotation the dynamo-electric micromachine; and
   an electronic control system for governing the electrically controlled actuator for controlling the radial displacement of the at least one tool, the electronic control system further comprising:
   an electronic control unit located in a stationary position with respect to the fixed supporting structure of the machining unit;

a wireless communication system including a wireless transmitter and a receiver device, one of the respective wireless transmitter and receiver device situated in a stationary position with respect to the fixed supporting structure and the other of the wireless transmitter and receiver device mounted on the tool-holder assembly.

10. The unit according to claim 9, wherein the tool-holder assembly includes a secondary pipe, which derives from a main pipe that is designed to feed pressurized lubricant-coolant to a machining area, the secondary pipe being provided for feeding a part of the flow of the pressurized lubricant-coolant to the microturbine.

11. The unit according to claim 9 further comprising an electronic-control card in electrical communication with the electrically controlled actuator, the control card operable to receive a signal output from a position detector.

* * * * *